Sept. 21, 1926.  1,600,478
F. LAWACZECK
ELECTROLYTIC APPARATUS
Filed Oct. 13, 1924
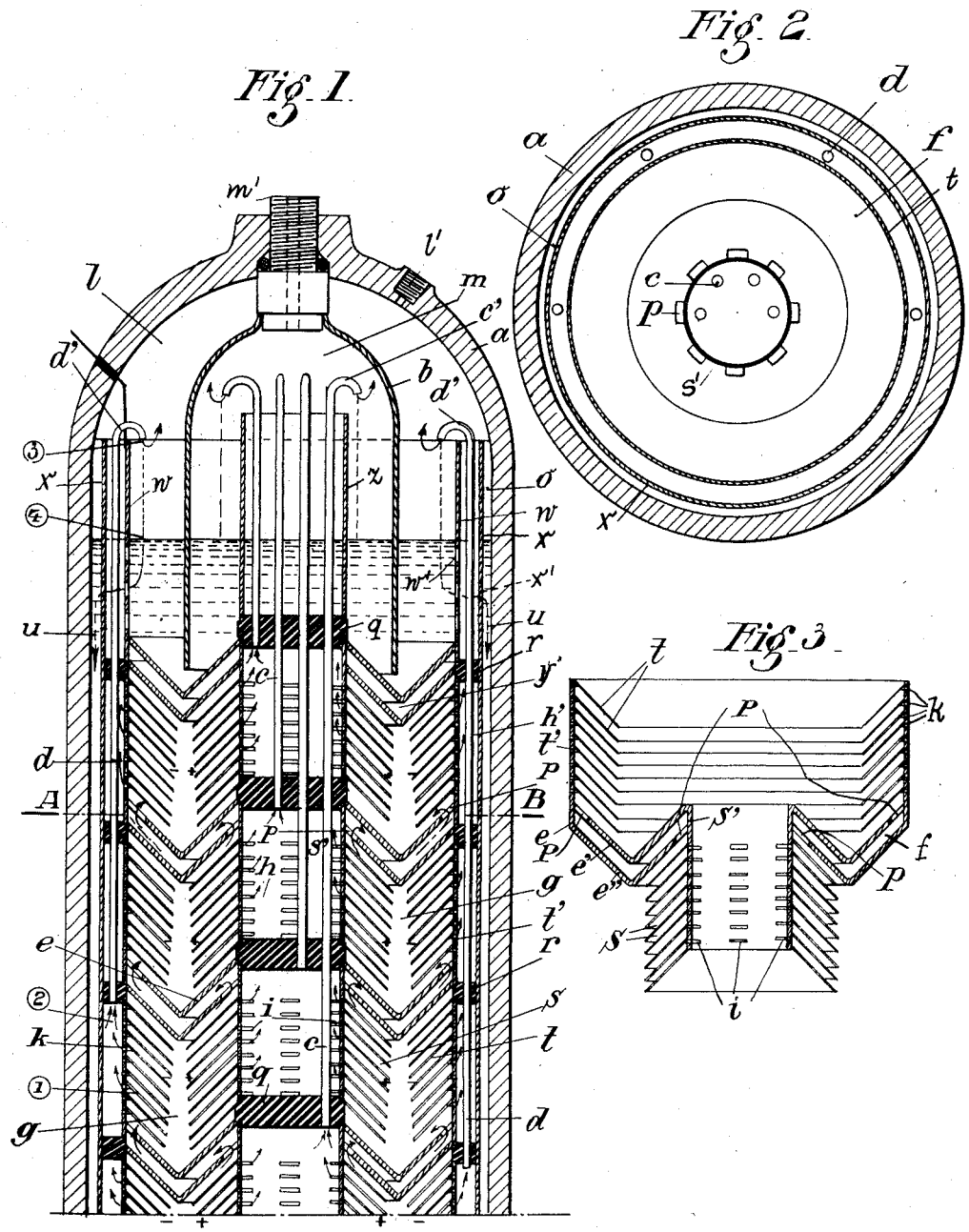
Inventor:
Franz Lawaczeck
by [signature]
Attorney.

Patented Sept. 21, 1926.

1,600,478

UNITED STATES PATENT OFFICE.

FRANZ LAWACZECK, OF MUNICH-MITTENSENDLING, GERMANY.

ELECTROLYTIC APPARATUS.

Application filed October 13, 1924, Serial No. 743,382, and in Germany October 20, 1923.

My invention relates to electrolytic apparatus and more especially to apparatus of the kind in which gases liberated in a liquid by electrolytic dissociation such as, for instance oxygen and hydrogen, are collected separately under pressure. It is an object of my invention to provide an apparatus of the kind described in which electrolysis can be performed under economical conditions by means of direct current of high voltage. Low resistance of the electrolytic cell and low voltage between its electrodes govern the economy of electrolysis in general and electrolytic dissociation of water in particular. On the other hand the energy for operating the electrolytic cell is as a rule available in the form of direct current of a voltage which is a multiple of the voltage required for a single cell. The expedient of connecting so many cells in series that their combined voltage is equal to the voltage of the available current is unsatisfactory even if dissociation is effected at atmospheric pressure inasmuch as the apparatus which results is very cumbersome. If dissociation shall be effected under pressure and the gases shall be collected separately under pressure, the design becomes too complicated and its operation too involved for economical production.

For these reasons it was impossible heretofore to fully utilize the available high direct current voltage. According to my invention, now, such current can be utilized in electrolytic dissociating apparatus in which the gases, for instance, oxygen and hydrogen, are collected separately under pressure, without involving the above mentioned drawbacks. This is effected by arranging in a pressure chamber a plurality of insulated electrolytic cells connected in series, the electrolyte being allowed free access to all cells. By these means and notwithstanding the desirable small resistance of the single cells, it is possible to so increase the total resistance of the apparatus by combining a corresponding number of cells that any voltage may be connected to the terminals of the apparatus.

In order to reduce to a minimum any tendency of the current to flow between the positive terminals of two adjacent cells instead of following its normal path between the two rows of electrodes in each cell, and to make such current practically zero as compared with the available current, the path of the current between the positive terminals should be long and of high ohmic resistance. The solution of this problem is greatly facilitated according to my invention by conducting the electrolyte between walls of two adjacent cells which are under equal potential.

In the drawings affixed to this specification and forming part theerof electrolytic apparatus embodying my invention for the production of gases from a liquid is illustrated diagrammatically by way of example.

In the drawings

Fig. 1 is a longitudinal section of the upper portion of a vertical pressure receptacle comprising vertically superimposed and insulated cells connected in series.

Fig. 2 is a section on the line A—B in Fig. 1 and

Fig. 3 is a sectional elevation of one of the units forming the cells.

In a reservoir $a$ which may have the form of a gas bottle for high internal pressure, a plurality of annular electrolytic cells $g$ are arranged vertically above one another. The annular cells consist of superimposed units $e$ shown more particularly in Fig. 3 with insulating plates $q$ and insulating rings $r$ inserted between the single units. The positive and negative electrodes $s$ and $t$, respectively, are alternately arranged on cylinders $s'$ and $t'$ which form the inner and outer walls of each unit.

The electrodes $s$ and $t$ are preferably ring-shaped truncated cones arranged one above the other, the upper rims of the cones $s$ being secured to the cylinder $s'$, those of the concentric cones $t$ to the cylinder $t'$. Preferably the inner or lower rims of the electrodes are bent downwards and the electrodes are so arranged that the rim of each upper electrode projects beyond the rim of the electrode below so as to intercept the rising gas bubbles. The rims may also be serrated. Gas ports $i$ and $k$ are formed in the walls $s'$ and $t'$, respectively.

Each cell $g$ is connected with the adjacent cells above and below by conduits $f$ which are formed by walls $e'$, $e''$ in the bottom of each unit $e$. Ports $p$ are formed in these walls, the port in the outer wall $e'$ being on the outside and the port in the inner wall $e''$ being on the inside of the conduit or vice versa, so that the electrolyte is compelled to flow in a long path between two adjacent cells, the free access of the electrolyte from the interior of reservoir $a$ to the several cells being however unobstructed.

The units $e$ are designed with a view to facilitate their assembling. The unit $e$ shown in Fig. 3 comprises two concentric cylinders of different diameter, the upper and wider cylinder being the outer or negative wall $t'$ of one cell, while the lower and narrower cylinder is the inner or positive wall $s'$ of the cell next following in downward direction. In this manner, two assembled units form two cells $g$, the two cylinders $s'$ and $t'$ being connected by the walls $e'$ and $e''$ which form the V-shaped conduit $f$. The wall $e'$ forms the bottom of the upper cell, the wall $e''$ forms the cover of the cell below. At the same time, these walls form direct electrical connections between the positive electrodes $s$ and the negative electrodes $t$.

All parts in the reservoir $a$ with the exception of the annular electrodes $s$, $t$ are coated with insulating material. A row of cells $g$ is formed by simply superimposing so many units $e$ and inserting insulators $q$ and $r$ between their cylinders $s'$ and $t'$.

The cells $g$ are surrounded on the outside by a cylindrical shell $x$ perforated at $x'$ and surrounding the insulating rings $r$. A concentric cylinder $w$ perforated at $w'$ and provided with a V-shaped bottom $y$ is placed on the topmost insulating ring $r$.

The units at the upper and lower ends of the series of cells $g$ are connected with the positive and negative terminals of a source of energy, as indicated at $v$ in Fig. 1 for the negative terminal, the positive terminal being not shown. Current flows between the sets of electrodes $s$ and $t$ in each cell $g$ of the series and oxygen and hydrogen rise between the inclined annular electordes and escape separately through the ports $i$ and $k$ in the walls $s'$ and $t'$, respectively. These ports are connected with chambers $h$, $h'$ which are defined by the insulators $q$ and $r$, respectively. All the chambers containing the same gas are connected with a separate gas collecting chamber. In the present case, two gas collecting chambers $l$ and $m$ are formed in the pressure receptacle $a$. The topmost insulating disc $q$ is inserted between the top of the smaller cylinder $s'$ and cylinder $z$. Cylinder $z$ is surrounded with a clearance by a bell-shaped partition $b$ which forms the gas collecting chamber $m$ and is suspended from the top of the reservoir $a$ by a perforated plug $m'$ to which a pipe may be connected. The other gas collecting chamber $l$ is formed by the top of the reservoir and connected with a threaded bore $l'$ to which a pipe connection may be secured. The gas chambers $h$ and $h'$ are connected with the collecting chambers by pipes $c$ and $d$, respectively. By conducting the gases to said pipes, the buoyancy of the gas bubbles is increased and a more vigorous circulation of the electrolyte is effected so that the danger of the two gases intermixing is greatly reduced. The overlapping downwardly bent inner rims of the electrodes prevent escape of the bubbles formed at the rims of the electrodes into the wrong collecting chamber.

The electrolyte is caused to circulate by the flow of the gases and is carried along with them as a froth as far as the rebends $b'$ and $c'$ of the pipes $c$ and $d$ from which it returns in drops to the body of the electrolyte. Such volume of the electrolyte in the cells which has been transformed into gas, is made up by fresh electrolyte from the upper portion of the reservoir $a$. As indicated by the dotted arrow $u$ in Fig. 1, this fresh electrolyte flows downward along the shell $w$ in the gap $o$ between the shell and the wall of the receptacle $a$ and enters the conduits $f$ from which it passes into the several cells $g$ through the ports $p$. However the electrolyte may also be conducted to each cell by separate pipes.

The current, instead of following the normal path as described, might have a tendency of flowing from the negative terminals of one cell to the positive electrodes of the adjacent cell through the electrolyte, not through the electrodes. This is rendered impossible because the electrolyte in separate cells is connected by way of the conduits $f$ along the walls $e'$ and $e''$ which are of equal potential. The path from the terminal of any one cell through the respective gas pipe and the froth of electrolyte rising in the pipe with the gas bubbles and dripping into the electrolyte at the top of the reservoir as shown by the numerals 1, 2, 3, 4 in Fig. 1, is so long and its ohmic resistance is so considerable that loss of current arising from this cause is practically excluded.

Practically the only path on which current can flow, is the normal path between the electrodes $s$, $t$ of the series of cells.

I wish it to be understood that I do not desire to be limited to the exact details of construction shown and described, for many obvious modifications will occur to a person skilled in the art.

I claim:

1. Electrolytic apparatus comprising a pressure receptacle adapted to be filled with electrolyte, a plurality of cells insulated from each other and arranged in said receptacle, said cells communicating with the electrolyte in said pressure receptacle, means for supplying current to the first of the series of cells and means for collecting separately and under pressure the gases liberated from the electrolyte.

2. Electrolytic apparatus comprising a pressure receptacle adapted to be filled with electrolyte, a plurality of superimposed cells insulated from each other and arranged in said receptacle, said cells communicating with the electrolyte in said pressure receptacle, means for supplying current to the first of the series of cells and means for collecting separately and under pressure the gases liberated from the electrolyte.

3. Electrolytic apparatus comprising a pressure receptacle adapted to be filled with electrolyte, a plurality of superimposed annular cells insulated from each other and arranged in said receptacle, said cells communicating with the electrolyte in said pressure receptacle, means for supplying current to the first of the series of cells and means for collecting separately and under pressure the gases liberated from the electrolyte.

4. Electrolytic apparatus comprising a pressure receptacle adapted to be filled with electrolyte, a plurality of cells insulated from each other and arranged in said receptacle, sets of positive and negative electrodes arranged on opposite sides of said cells, said cells communicating with the electrolyte in said pressure receptacle means for supplying current to the first of the series of cells and means for collecting separately and under pressure the gases liberated from the electrolyte.

5. Electrolytic apparatus comprising a pressure receptacle adapted to be filled with electrolyte, a plurality of cells insulated from each other and arranged in said receptacle, sets of annular superimposed electrodes in said cells, the rim of each upper electrode projecting beyond the rim of each lower electrode, said cells communicating with the electrolyte in said pressure receptacle, means for supplying current to the first of the series of cells and means for collecting separately and under pressure the gases liberated from the electrolyte.

6. Electrolytic apparatus comprising a pressure receptacle adapted to be filled with electrolyte, a plurality of cells insulated from each other and arranged in said receptacle, sets of annular superimposed downwardly bent electrodes in said cells, the rim of each upper electrode projecting beyond the rim of each lower electrode, said cells communicating with the electrolyte in said pressure receptacle, means for supplying current to the first of the series of cells and means for collecting separately and under pressure the gases liberated from the electrolyte.

7. Electrolytic apparatus comprising a pressure receptacle adapted to be filled with electrolyte, a plurality of cells insulated from each other and arranged in said receptacle said cells communicating with the electrolyte in said pressure receptacle, said cells being formed by independent units containing each one set of electrodes for two adjacent cells and communicating with the electrolyte in said pressure receptacle, means for supplying current to the first of the series of cells and means for collecting separately and under pressure the gases liberated from the electrolyte.

8. Electrolytic apparatus comprising a pressure receptacle adapted to be filled with electrolyte, a plurality of cells insulated from each other and arranged in said receptacle said cells communicating with the electrolyte in said pressure receptacle, said cells being formed by independent units containing each one set of electrodes for two adjacent cells and co-axial inner and outer cylinders to each of which is secured one set of electrodes and communicating with the electrolyte in said pressure receptacle, means for supplying current to the first of the series of cells and means for collecting separately and under pressure the gases liberated from the electrolyte.

9. Electrolytic apparatus comprising a pressure receptacle adapted to be filled with electrolyte, a plurality of superimposed perforated cells insulated from each other and arranged in said receptacle, said cells communicating with the electrolyte in said pressure receptacle, means for supplying current to the first of the series of cells and means for collecting separately and under pressure the gases liberated from the electrolyte.

10. Electrolytic apparatus comprising a pressure receptacle adapted to be filled with electrolyte, a plurality of cells insulated from each other and arranged in said pressure receptacle said cells communicating with the electrolyte in said pressure receptacle, said cells being formed by independent units containing each one set of electrodes for two adjacent cells and co-axial inner and outer cylinders to each of which is secured one set of electrodes, transverse walls of conductive material connecting the upper and lower ends of the cylinders in each unit and communicating with the electrolyte in said pressure receptacle, means for supplying current to the first of the series of cells and means for collecting separately and under pressure the gases liberated from the electrolyte.

11. Electrolytic apparatus comprising a pressure receptacle adapted to be filled with electrolyte, a plurality of cells insulated from each other and arranged in said receptacle said cells communicating with the electrolyte in said pressure receptacle, said cells being formed by independent units containing each one set of electrodes for two adjacent cells and co-axial inner and outer cylinders to each of which is secured one set of electrodes, transverse walls of conductive material perforated at alternate ends, connecting the upper and lower ends of the cylinders in each unit and communicating with the electrolyte in said pressure receptacle, means for supplying current to the first of the series of cells and means for collecting separately and under pressure the gases liberated from the electrolyte.

12. Electrolytic apparatus comprising a pressure receptacle adapted to be filled with electrolyte, a plurality of cells insulated from each other and arranged in said receptacle said cells communicating with the electrolyte in said pressure receptacle, said cells being formed by independent units containing each one set of electrodes for two adjacent cells and co-axial inner and outer cylinders to each of which is secured one set of electrodes, transverse parallel and V-shaped walls of conductive material perforated at alternate ends, connecting the upper and lower ends of the cylinders in each unit and communicating with the electrolyte in said pressure receptacle, means for supplying current to th first of the series of cells and means for collecting separately and under pressure the gases liberated from the electrolyte.

13. Electrolytic apparatus comprising a pressure receptacle adapted to be filled with electrolyte, a plurality of cells insulated from each other and arranged in said receptacle said cells communicating with the electrolyte in said pressure receptacle, said cells being formed by independent units containing each one set of electrodes for two adjacent cells and co-axial inner and outer cylinders to each of which is secured one set of electrodes, transverse parallel and V-shaped walls of conductive material perforated at alternate ends, connecting the upper and lower ends of the cylinders in each unit, said walls defining an electrolyte conduit for the connection of two adjacent cells and communicating with the electrolyte in said pressure receptacle, means for supplying current to the first of the series of cells and means for collecting separately and under pressure the gases liberated from the electrolyte.

14. Electrolytic apparatus comprising a pressure receptacle adapted to be filled with electrolyte, a plurality of cells insulated from each other and arranged in said receptacle, said cells communicating with the electrolyte in said pressure receptacle, means for interposing a long body of electrolyte between the positive terminals of adjacent cells, means for supplying current to the first of the series of cells and means for collecting separately and under pressure the gases liberated from the electrolyte.

15. Electrolytic apparatus comprising a pressure receptacle adapted to be filled with electrolyte, a plurality of cells insulated from each other and arranged in said receptacle, said cells communicating with the electrolyte in said pressure receptacle, means for interposing a long body of electrolyte between the positive terminals of adjacent cells, walls under equal potential adapted to define the body of electrolyte, means for supplying current to the first of the series of cells and means for collecting separately and under pressure the gases liberated from the electrolyte.

16. Electrolytic apparatus comprising a pressure receptacle adapted to be filled with electrolyte, a plurality of cells insulated from each other and arranged in said receptacle, said cells communicating with the electrolyte in said pressure receptacle, means for supplying current to the first of the series of cells, means for collecting separately and under pressure the gases liberated from the electrolyte, an electrolyte storage chamber in said apparatus and means for conducting electrolyte from said storage chamber to each of said cells.

17. Electrolytic apparatus comprising a pressure receptacle adapted to be filled with electrolyte, a plurality of cells insulated from each other and arranged in said receptacle said cells communicating with the electrolyte in said pressure receptacle, said cells being formed by independent units containing each one set of electrodes for two adjacent cells and co-axial inner and outer cylinders to each of which is secured one set of electrodes, solid insulators interposed between said inner cylinders so as to define gas chambers therein and annular insulators adapted to be interposed between said outer cylinders and a shell adapted to be placed over said annular insulators between said outer cylinders and said shell, gas pipes connected to each of the chambers defined by said insulators and communicating with the electrolyte in said pressure receptacle, means for supplying current to the first of the series of cells and means for collecting separately and under pressure the gases liberated from the electrolyte.

18. Electrolytic apparatus comprising a pressure receptacle adapted to be filled with electrolyte, a plurality of cells insulated from each other and arranged in said receptacle said cells communicating with the electrolyte in said pressure receptacle, said cells being formed by independent units containing each one set of electrodes for two adjacent cells and co-axial inner and outer cylinders to each of which is secured one set of electrodes, solid insulators interposed between said inner cylinders so as to define gas chambers therein and annular insulators adapted to be interposed between said outer cylinders and a shell adapted to be placed over said annular insulators between said outer cylinders and said shell, gas pipes connected to each of the chambers defined by said insulators said gas chambers being arranged in groups, each group being adapted to receive one of the gases liberated from the electrolyte, separate collecting chambers for each gas defined in said pressure chamber, gas pipes connecting each group of chambers with one of said gas collecting chambers and communicating with the electrolyte in said pressure receptacle, means for supplying current to the first of the series of cells and means for collecting separately and under pressure the gases liberated from the electrolyte.

In testimony whereof I affix my signature.

FRANZ LAWACZECK.